United States Patent Office 3,515,561
Patented June 2, 1970

3,515,561
METHOD OF PREPARING A CHOPPED
MEAT COMPOSITION
Peter Flesch, Maler-Becker-Str. 5, Mainz-Gonsenheim, Germany, and Gerhard Bauer, Am Mittelpfad 17, Haltingen, Germany
No Drawing. Filed Aug. 25, 1966, Ser. No. 574,916
Claims priority, application Switzerland, Aug. 25, 1965, 11,927/65
Int. Cl. A22c 11/00
U.S. Cl. 99—108                          5 Claims

ABSTRACT OF THE DISCLOSURE

Sausage meat compositions containing an alkali phosphate, sorbic acid and/or potassium sorbate.

---

The present invention relates to sausages and sausage meat compositions consisting of predominantly meat and fat, which have to be cooked, grilled, roasted or the like—sometimes after having been partially pre-cooked, smoked, pickled, etc.—prior to consumption, and to improvements in the preparation thereof.

It is known, in the preparation of this type of sausage or sausage meat—which term is intended to include sausage in encased form (where, as in the frankfurter, the sausage meat is in a casing) or in so-called "skinless" sausage or non-encased patty, or even (e.g. hamburger, etc.), form—to employ a so-called auxiliary in the cut-up or chopped meat ("Kutterhilfsmittel"), where the meat can not be processed immediately following slaughtering of the animal. In practice, cutter auxiliaries which have given best protection have been preparations on the basis of condensed alkali phosphates. Other chopped meat auxiliaries which have been employed have been the various "food additive" acids, such as citric acid, tartaric acid, lactic acid and acetic acid, advantageously, in the form of their sodium salts, although these additives are not as good as the phosphates in their action on the swelling of the meat fibers and on the fat bonding.

It is also known to add ascorbic acid to the raw meat composition, as color control agent. When use is made of sorbic acid and/or potassium sorbate, the nitrite content of the seasoning salt can be considerably reduced without change in color of the meat.

From the standpoint of toxicologists, all phosphates with more than three P atoms are not substances which are "native" to the body and are therefore objectionable from the physiological viewpoint. The mono-, di- and triphosphates, on the other hand, are regarded as "native" and can therefore be employed without objection as meat auxiliary or additive.

The research on which the present invention is based was directed toward determining whether, in the manufacture of raw meat sausage compositions, the "simple" phosphates, such as disodium hydrogen phosphate, and the condensed phosphates with two or three P atoms, such as sodium pyrophosphate and sodium tripolyphosphate, would make possible realization of a sufficient water binding, even if a part of the phosphate were replaced by a food-additive acid as above defined.

The present invention is thus concerned with the preparation of sausage meat compositions with the addition of an additive which contains at least one alkali phosphate of the aforeindicated condensation degree, sorbic acid and/or potassium sorbate, and which may also contain an organic acid which is non-toxic to humans and/or a sodium salt thereof. The additive may also contain ascorbic acid or sodium ascorbate.

It has been found that up to 50% of the employed phosphate can be replaced for instance by trisodium citrate without noticeable reduction of the water-binding capacity of the chopped meat composition. The trisodium citrate can, with the same effect, be replaced for example by a mixture of trisodium citrate and disodium tartrate.

It has further been found that in those cases where the additive also contains 5 to 10% by weight of sorbic acid and/or potassium sorbate, in addition to phosphates or a mixture of phosphate and sodium citrate or phosphate, sodium citrate and sodium tartrate, the extent of color change and of color retention of the so-prepared chopped meat composition is improved.

The general method of procedure in preparing a meat composition is as follows:

Lean meat which has been "dry-pickled" (e.g. admixed with dry seasoning agents or the like, e.g. so-called "nitrite pickling salt") is comminuted in a meat grinder and placed in the cutter or chopper machine, then similarly comminuted fat meat and a quantity, e.g. 0.3% by weight relative to the quantity of meat and fat, of one of the additives specified in the examples which follow are added, and the entire mixture is pre-cut. After the addition of the usual equivalent quantity of ice water, the cutting or chopping is continued until complete homogenization of the mixture is achieved. The finished composition thus obtained is, for example, filled into casings of the kind conventionally employed in making of encased sausage, whereupon the obtained products can be cooked (grilled, boiled, roasted, etc.) in per se conventional manner. In the skinless patty type, the casing filling operation can be omitted.

The composition of the additive is widely variable as will appear from the following illustrations which, it will be understood are intended to be only exemplary and not limitative. Percentages are by weight.

EXAMPLE 1

The meat composition is prepared after the above-described manner employing an additive of the following composition:

|   | Percent |
|---|---|
| Trisodium citrate | 44 |
| Disodium hydrogen phosphate | 44 |
| Sodium ascorbate | 2 |
| Sorbic acid | 5 |
| Potassium sorbate | 5 | and the mixture is worked up into sausage form.

The disodium hydrogen phosphate can be replaced by a corresponding quantity of sodium pyrophosphate.

EXAMPLE 2

The meat composition is prepared after the above-described manner employing an additive of the following composition:

|   | Percent |
|---|---|
| Trisodium phosphate | 49 |
| Disodium hydrogen phosphate | 49 |
| Sodium ascorbate | 2 |

EXAMPLE 3

The meat composition is prepared after the above-described manner employing an additive of the following composition:

|   | Percent |
|---|---|
| Disodium hydrogen phosphate | 88 |
| Sodium ascorbate | 2 |
| Sorbic acid | 5 |
| Potassium sorbate | 5 |

EXAMPLE 4

The meat composition is prepared after the above-described manner employing an additive of the following composition:

| | Percent |
|---|---|
| Disodium hydrogen phosphate | 98 |
| Sodium ascorbate | 2 |

EXAMPLE 5

The meat composition is prepared after the above-described manner employing an additive of the following composition:

| | Percent |
|---|---|
| Sodium tripolyphosphate | 88 |
| Sodium ascorbate | 2 |
| Potassium sorbate | 10 |

EXAMPLE 6

The meat composition is prepared after the above-described manner employing an additive of the following composition:

| | Percent |
|---|---|
| Sodium tripolyphosphate | 98 |
| Sodium ascorbate | 2 |

EXAMPLE 7

The meat composition is prepared after the above-described manner employing an additive of the following composition:

| | Percent |
|---|---|
| Trisodium citrate | 44 |
| Sodium tripolyphosphate | 44 |
| Sodium ascorbate | 2 |
| Potassium sorbate | 10 |

EXAMPLE 8

The meat composition is prepared after the abovedescribed manner employing an additive of the following composition:

| | Percent |
|---|---|
| Trisodium citrate | 49 |
| Sodium tripolyphosphate | 49 |
| Sodium ascorbate | 2 |

In each of Examples 2, 3, and 4 the disodium hydrogen phosphate can be replaced by a corresponding quantity of sodium pyrophosphate.

In order to determine the water-binding effect realized according to this invention with the use of additives as above disclosed, tests were carried out in accordance with the method of R. Grau and H. Hamm (Naturwissenschaften 40, 29 [1953]). By this method, the expressable "free" water of the respective compositions can be determined very accurately. Using in each test 0.3 grams of finished meat composition containing 0.6% by weight of additive, the tests gave the following results:

| Composition according to Example: | "Free" water in mg./0.3 gram of composition |
|---|---|
| 1 | 65.4 |
| 3 | 65.7 |
| 5 | 48.1 |
| 7 | 47.8 |
| Control | 126.2 |

The control test was carried out with the same meat composition as used in the other test runs except that no additive was employed. No influence on the water binding could be observed for sorbic acid or potassium sorbate.

Having thus disclosed the invention, what is claimed is:

1. A method of preparing a chopped meat composition which comprises mixing with said chopped meat composition 0.3–0.6% by weight of the chopped meat composition of an additive comprising at least one alkali phosphate selected from the group consisting of a mono-, di- and tri-phosphates and from 5 to 10% by weight of the additive of at least one member selected from the group consisting of sorbic acid and potassium sorbate, whereby the sorbic acid or potassium sorbate is sufficient to effect color retention of the chopped meat composition.

2. A method as in claim 1, wherein the additive is present in an amount of 0.3% by weight of the chopped meat composition, said additive consisting of 44% by weight of trisodium citrate, 44% by weight of disodium hydrogen phosphate, 2% by weight of sodium ascorbate, 5% by weight of sorbic acid and 5% by weight of potassium sorbate.

3. A method as in claim 1, wherein a member selected from the group consisting of non-toxic organic acids and sodium salts thereof is added to the chopped meat composition.

4. A method as in claim 3, wherein the organic acid is selected from the group consisting of citric acid, tartaric acid, lactic acid, acetic acid and sodium salts thereof.

5. A method as in claim 1, wherein a member selected from the group consisting of ascorbic acid and sodium ascorbate is added to the chopped meat composition.

References Cited

UNITED STATES PATENTS

| | | | |
|---|---|---|---|
| 2,056,176 | 10/1936 | Engels et al. | |
| 2,903,366 | 9/1959 | Barnett | 99—159 |
| 3,026,206 | 3/1962 | Williams. | |
| 3,028,246 | 4/1962 | Oliver et al. | 99—159 X |
| 3,099,566 | 7/1963 | Flesch et al. | 99—59 |
| 3,154,423 | 10/1964 | Voegeli et al. | 99—107 X |
| 3,065,084 | 11/1962 | Melnick et al. | 99—107 X |
| 2,933,399 | 4/1960 | Nickerson et al. | 99—109 X |

HYMAN LORD, Primary Examiner

U.S. Cl. X.R.

99—109